(12) United States Patent
Gao et al.

(10) Patent No.: US 7,149,591 B2
(45) Date of Patent: Dec. 12, 2006

(54) MULTI-RESOLUTION CONTROLLER

(75) Inventors: Zhiqiang Gao, Westlake, OH (US);
Shahid Parvez, Willoughby Hills, OH (US)

(73) Assignee: Cleveland State University, Cleveland, OH (US)

( * ) Notice: Subject to any disclaimer, the term of this patent is extended or adjusted under 35 U.S.C. 154(b) by 127 days.

(21) Appl. No.: 10/676,331

(22) Filed: Oct. 1, 2003

(65) Prior Publication Data

US 2005/0075740 A1     Apr. 7, 2005

(51) Int. Cl.
*G05B 15/00*     (2006.01)
*G05B 11/01*     (2006.01)
*G05B 13/02*     (2006.01)

(52) U.S. Cl. .............................. 700/78; 700/1; 700/40; 700/42; 700/69

(58) Field of Classification Search .................. 700/1, 700/40, 42, 43, 78, 67, 69; 704/205, 219
See application file for complete search history.

(56) References Cited

U.S. PATENT DOCUMENTS

| 5,329,587 A | * | 7/1994 | Morgan et al. ............. 370/291 |
| 5,610,843 A | | 3/1997 | Chou |
| 5,781,888 A | * | 7/1998 | Herre .......................... 704/205 |
| 6,479,099 B1 | | 11/2002 | Takahashi et al. |
| 6,480,750 B1 | | 11/2002 | Junk |
| 6,497,099 B1 | | 12/2002 | Junk |

OTHER PUBLICATIONS

Shahid Parvez and Zhiqiang Gao, "A Novel Controller Based on Multi-Resolution Decomposition Using Wavelet Transforms", Cleveland State Universty, http://academic.csuohio.edu/cact/publications/ISA_2002Wavelet.pdf.*
"Recent Publications", Center for Advanced Control Technology, http://academic.csuohio.edu/cact/publications.htm, p. 5.*
"ISA 2002 Archive", The Instrumentation, Systems, and Automation Society, http://www.isa.org/Content/NavigationMenu/Professionals_and_Practitioners/Conferences_and_Exhibitions/ISA_2002_(Archive)/ISA_2002_(Archive).htm.*
Rashid-Farrokhi, Liu, Bernstein, and Walnut, "Wavelet-Based Multiresolution Local Tomography", Oct. 10, 1997, IEE, vol. 6, No. 10.*
Huang, "Wavelet Transform Adaptive Signal Detection", 1999, North Carolina State University.*
NCSU Libraries, North Carolina State University, http://www.lib.ncsu.edu/searchcollection/.*
Olivier Rioul and Martin Vetterli, Wavelets and Signal Processing:, IEEE SP Magazine, Oct. 1991, pp. 14-38.
Huang, Online Characterization of Fabric Compressional Behavior, Ph. D. dissertation, North Carolina State University, Raleigh, North Carolina, 1999.

* cited by examiner

*Primary Examiner*—Kidest Bahta
*Assistant Examiner*—Charles Kesenge
(74) *Attorney, Agent, or Firm*—Calfee, Halter & Griswold LLP

(57) ABSTRACT

A method for producing a control output is described. The method includes identifying an error signal and decomposing the error signal into a plurality of signal components. The signal components are determined based on a plurality of orthogonal functions representing multi-resolution decomposition properties. The method further includes transforming each signal component. The transformed signal components are summed to determine a control signal.

36 Claims, 10 Drawing Sheets

MULTI-RESOLUTION CONTROLLER

TECHNICAL FIELD

The systems, methods, and computer readable media described herein relate generally to controllers and more particularly to a multi-resolution controller using wavelets.

BACKGROUND

Proportional-Integral-Derivative (PID) controllers are widely used across many industries. PID controllers are relatively easy to implement and relatively simple to tune. In general, a PID controller takes as its input the error (e) from a control system and acts on the error to generate a control output (u). While PID controllers are widely used and provide satisfactory results in many applications, other controllers may also be desired.

Some prior art patents using wavelets in controls include U.S. Pat. No. 5,610,843, which involves control of a Multi-Input, Multi-Output ("MIMO") system, and provides a method for implementing a controller in a system having many sensors and actuators. Additionally, the disclosure involves computing two transfer functions P and Q (transfer function from actuator to sensor and transfer function matrix from sensor back to actuator) using wavelet transforms on a multi-scale basis. The controller K is then implemented using Q-parameterization as $K=(I+PQ)^{-1} Q$.

U.S. Pat. No. 6,480,750 provides means to perform autotracking by adjusting the controller (PID) parameters. A wavelet transformation of the control signal and the output signal is done. The result of the analysis is transformed into a system of differential equations. The formulation of the system of differential equations serves to establish a mathematical function which characterizes the response of a plant. Based on the response from the plant it is possible to document changes in the response characteristics of the controlled system. It is possible in this way for the control system to be adapted to simply prescribe operating states of the controlled system which keeps recurring during operation of the controlled system. U.S. Pat. No. 6,497,099 is similar, but has a specific application to a steam turbine.

SUMMARY

The following presents a simplified summary of methods, systems, and computer readable media associated with a multi-resolution controller to facilitate providing a basic understanding of these items. This summary is not an extensive overview and is not intended to identify key or critical elements of the methods, systems, and computer readable media or to delineate the scope of these items. This summary provides a conceptual introduction in a simplified form as a prelude to the more detailed description that is presented later.

Wavelet theory, developed as a mathematical tool, has application in various industrial, commercial and consumer applications. Wavelets, as well as other sets of orthogonal functions, possess properties that make them suitable for analyzing data like error signals and control signals. Such functions can reveal local properties of data and facilitate multi-scale analysis. Use of a multi-resolution controller, such as a Wavelet Controller ("WC") to revealing local properties of data improves error correction particularly in applications that require online or real time response to changes, like process control.

Conventional PID controllers take as input the error (e) from system and act on the error to generate a control output (u). A multi-resolution controller decomposes the error signal e into, for example, high, low and intermediate scale signals using the multi-resolution decomposition property of orthogonal functions, such as wavelets. The high scale signal captures low frequency information while low scale signal captures high frequency information and the intermediate scale signal captures intermediate frequency information of the error signal. These error signal components can then be transformed and summed to generate a control signal u. As referred to throughout this application, the transformation may include the application of a function or the use of a numeric gain as a coefficient.

This disclosure provides methods and systems relating to multi-resolution controllers. According to one aspect of the disclosure, a method for producing a control output is disclosed. The method includes identifying an error signal and decomposing the error signal into a plurality of signal components. The plurality of signal components are determined based on a plurality of orthogonal functions representing multi-resolution decomposition properties, and the sum of the plurality of signal components equals the error signal. The method further includes transforming each signal component. The transformed signal components are summed to determine a control signal. A system, apparatus and article of manufacture are also disclosed for implementing the method for producing the control signal.

In one example, a control system employs a wavelet controller based on multi-resolution decomposition. By way of illustration, the output from an industrial control system may be affected by uncertainties like measurement noise, frictional variations and external torque disturbances, which manifest at different scales. Thus, the output may include data signal and error signal, which may be affected by noise. Wavelets are employed to decompose the error signal into signals at different scales. These signals may be multiplied by different gains and combined to generate a controller output, which is used to compensate for the uncertainties in the plant.

Certain illustrative example methods, systems, computer readable media and so on are described herein in connection with the following description and the annexed drawings. These examples are indicative, however, of but a few of the various ways in which the principles of the methods, systems, computer readable media and so on may be employed and thus are intended to be inclusive of equivalents. Other advantages and novel features may become apparent from the following detailed description when considered in conjunction with the drawings.

BRIEF DESCRIPTION OF THE DRAWINGS

Comprehension of the invention is facilitated by reading the following detailed description, in conjunction with the associated drawings, in which.

DETAILED DESCRIPTION

Figure 1:
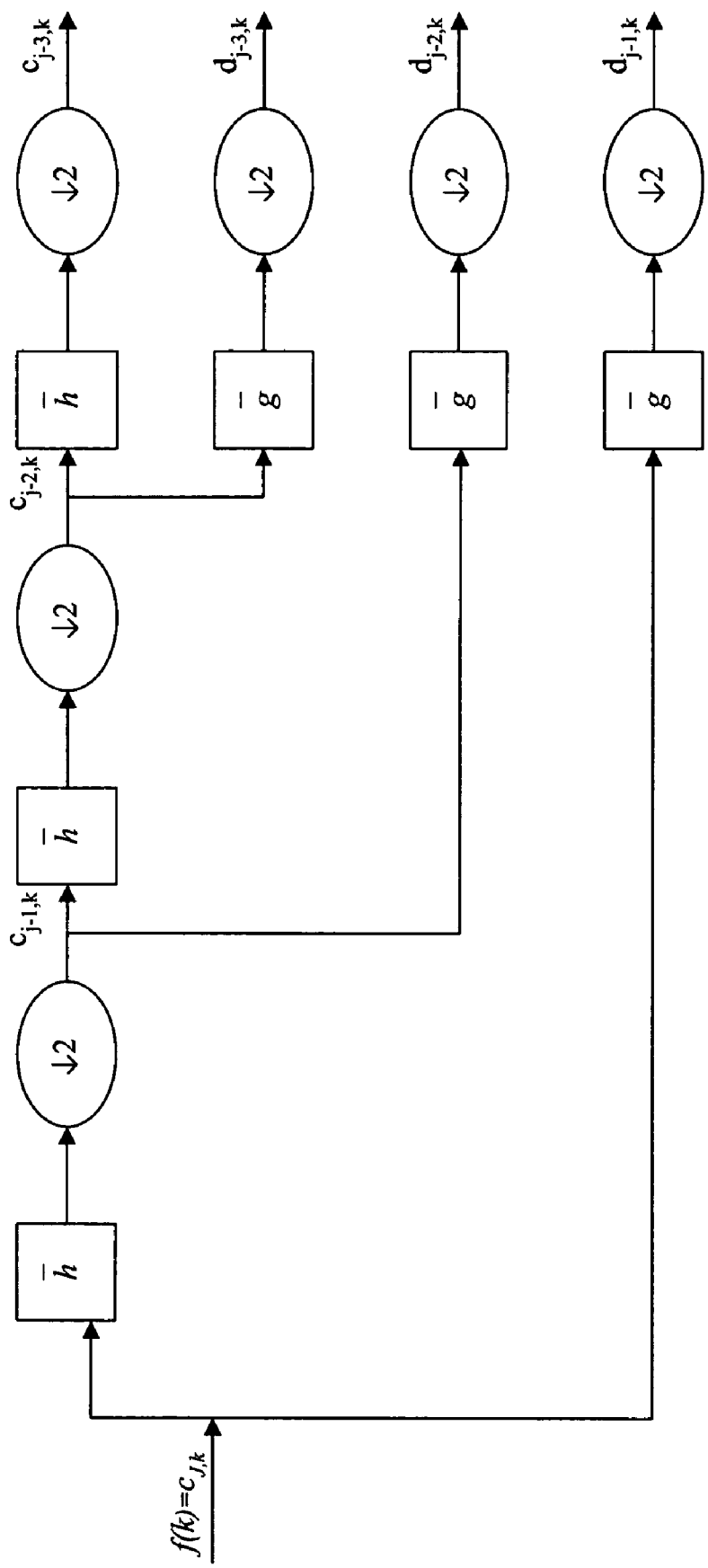
FIG. 1 is a block diagram illustrating an example three level decomposition analysis using sub-band coding in accordance with the present invention.

Example systems, methods, computer media, and so on are now described with reference to the drawings, where like reference numerals are used to refer to like elements throughout. In the following description for purposes of explanation, numerous specific details are set forth in order to facilitate thoroughly understanding the methods, systems and computer readable media. It may be evident, however, that the methods, systems and computer readable media can be practiced without these specific details. In other instances, well-known structures and devices are shown in block diagram form in order to simplify description.

Some portions of the detailed descriptions that follow are presented in terms of algorithms and symbolic representations of operations on data bits within a computer memory. These algorithmic descriptions and representations are the means used by those skilled in the data processing arts to convey the substance of their work to others skilled in the art. An "algorithm" is here, and generally, conceived to be a self-consistent sequence leading to a desired result. The sequence includes actions like those requiring physical manipulations of physical quantities. Usually, though not necessarily, these quantities take the form of chemical, biological, electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise as apparent from the following discussions, it is appreciated that throughout the description, discussions utilizing terms like processing, computing, calculating, determining, displaying, or the like, refer to the action and processes of a computer system, computer component, logic, or similar electronic computing device, that manipulates and transforms data represented as physical (electronic) quantities within the computer system's registers and memories into other data similarly represented as physical quantities within the computer system memories or registers or other information storage, transmission or display devices.

It will be appreciated that some or all of the processes and methods of the system involve electronic and/or software applications that may be dynamic and flexible processes so that they may be performed in sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor (DSP), a software controlled microprocessor, or an ASIC. Components implemented as software are not limited to any particular programming language. Rather, the description herein provides the information one skilled in the art may use to fabricate circuits or to generate computer software and/or computer components to perform the processing of the system. It will be appreciated that some or all of the functions and/or behaviors of the present system and method may be implemented as logic as defined above.

Multi-resolution analysis is a convenient framework for hierarchically representing functions, signals, and the like on different scales. Multi-resolution analysis represents a function as a limit of successive approximations. The successive approximations are a smoother version of the original function with finer details added. Thus, wavelets are terminating basis vectors for decomposing a signal into a set of coefficients.

Consider a continuous signal, $f(t)$, and generate the following sequence of approximations, $$f^m(t) = \sum_{n=-\infty}^{\infty} f_{m,n} \phi(2^m t - n)_{m=0,1,2,...} \quad (1)$$

Each approximation is expressed as the weighted sum of the shifted versions of the same function, $\phi(\tau)$, which is called the scaling function. If the (m+1)th approximation is required to be a refinement of the mth approximation, then the function $\phi(2^m t)$, should be a linear combination of the basis functions spanning the space of the (m+1)th approximation, as in $$\phi(2^m t) = \sum_{k} h(k) \phi(2^{m+1} t - k) \quad (2)$$

If $V^{(m+1)}$ represents the space of functions spanned by the orthogonal set, $\{\phi(2^{(m+1)}t-k); k \epsilon Z,$ the set of integers$\}$, and $V^{(m)}$ the space of the coarser functions spanned by the orthogonal set, $\{\phi(2^{(m)}t-p); p \epsilon Z\}$ then $V^{(m)} \subset V^{(m+1)}$. Let $$V^{(m+1)} = V^{(m)} \oplus W^{(m)}, \quad (3)$$

then, $W^{(m)}$, is the space that contains the information added upon moving from the coarser, $f^{(m)}t$, to the finer, $f^{(m+1)}(t)$, representation of the original function, $f(t)$. There are spaces, $W^{(m)}$ that are spanned by the orthogonal translates of a single function, $\psi(2^{(m)}t)$, which leads to:

$$f^{(m+1)}(t) = f^m(t) + \sum_{n=-\infty}^{\infty} f_{m,n} \psi(2^m t - n) \quad (4)$$

The function, $\psi(2^{(m)}t)$, is called a wavelet and is related to the scaling function $\phi(2^{(m+1)}t)$, through the following relationship:

$$\psi(2^m t) = \sum_k g(k)\phi(2^{m+1}t - k) \quad (5)$$

h(k) and g(k) form a conjugate mirror filter pair. Thus, a wavelet series representation of the signal f(t) is given by:

$$f(t) = \sum_{k=-\infty}^{\infty} c_{m,k}\phi_{m,k}(t) + \sum_{j=1}^{m}\sum_{k=-\infty}^{\infty} d_{j,k}\psi_{j,k}(t) \quad (6)$$

$$c_{m,k} = \int f(t)\overline{\phi}_{m,k}(t)dt$$

$$d_{j,k} = \int f(t)\overline{\psi}_{j,k}(t)dt$$

Thus a wavelet transform decomposes a signal $f(t)$ into trend (c) and detail coefficients (d) as given in Equation (6). One method for in computing a Discrete Wavelet Transform (DWT) is to employ a sub-band coding scheme that uses the filters h(k) and g(k):

$$h(k) = \frac{1}{\sqrt{2}}\phi\left(\frac{k}{2}\right), \quad (7)$$

$$g(k) = \frac{1}{\sqrt{2}}\psi\left(\frac{k}{2}\right)$$

Decomposition includes computing trend and detail coefficients. A trend coefficient, convolved with a scaling function as the basis, generates the trend signal as shown on the left side of the summation in Equation (6). A detail coefficient, using the wavelets as a basis, generates the detail signal as shown on the right side of the summation in Equation 6. The trend signal captures high scale (low frequency) information and the detail signal captures low scale (high frequency) information contained in the signal $f(t)$. Depending upon the number of decomposition levels, the end product of a multi-resolution decomposition is a set of these signals at different scales (frequencies) as shown in Equation 8, where, $f_H$ is the high scale signal, $f_L$ is the Low scale signal and $f_{Mi}$ are the medium scale signals and N is the number of decomposition levels.

$$f(t) = f_H(t) + f_{M_1}(t) + \ldots + f_{M_{N-1}}(t) + f_L(t) \quad (8)$$

For example, a 3-level error signal decomposition results in one trend signal (low frequency) and three detail signals (high and intermediate frequency). There is redundancy in the trend signal and thus, in one example, one trend signal obtained at the last level is chosen. It is to be appreciated that in other examples one or more trend signals from one or more levels can be chosen. The frequency information of these decomposed signals is approximate.

Figure 2:
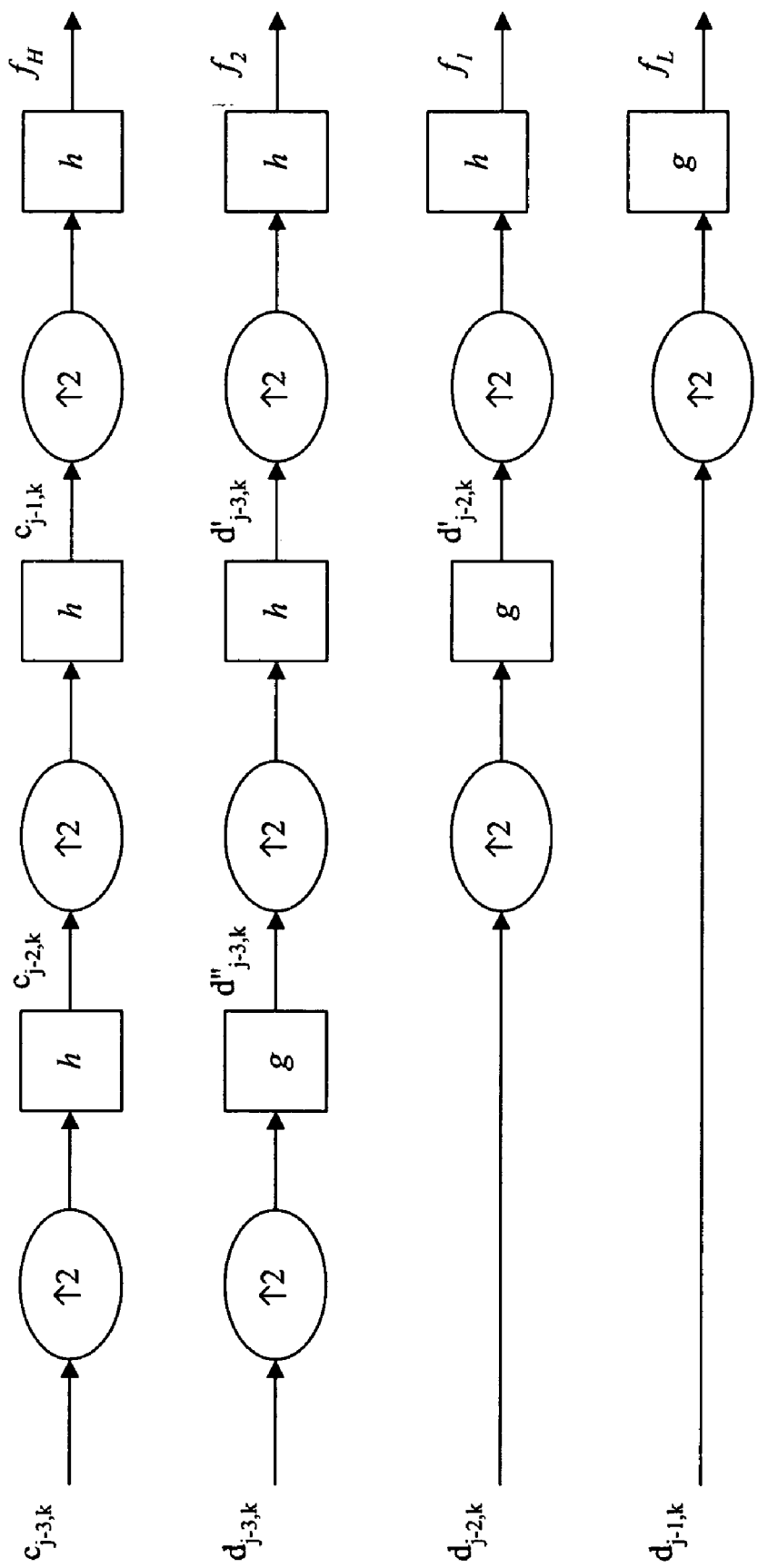
FIG. 2 is a block diagram illustrating an example of a synthesis process for the three level decomposition analysis of FIG. 1.

In one example, decomposing into trend and detail signals employs a sub-band coding scheme as illustrated in FIGS. 1 and 2. A Discrete Wavelet Transform (DWT) can be computed using the filters $\overline{h(k)}$ and $\overline{g(k)}$, which form a Quadrature Conjugate Mirror filter pair with h(k) and g(k), where h(k) and g(k) are given by Equation 7. FIG. 1 illustrates an analysis portion of a three level decomposition scheme using sub-band coding. The analysis yields a set of intermediate coefficients, which represent the weights of the original signal in terms of the basis functions used, namely the scaling function and the wavelet function. The original signal is filtered with the scaling filter and the wavelet filter and down-sampled by 2 resulting in the trend and detail coefficients at level one. The trend coefficients thus obtained are used as the original signal and filtered with scaling filter and the wavelet filter to yield the coefficients at level two. This process is repeated depending upon the number of decomposition levels desired.

The synthesis process involves up-sampling the coefficients obtained during the analysis step by a factor of two and filtering them with the corresponding reconstruction filters. The reconstruction filters h(k) and g(k) are the conjugate filters corresponding to scaling and wavelet filters respectively. An example synthesis process for a three level decomposition is shown in FIG. 2. The resultant signals are the trend signal $f_H$, the detail signal $f_L$ and the intermediate resolution signals $f_1$ and $f_2$.

Figure 3:
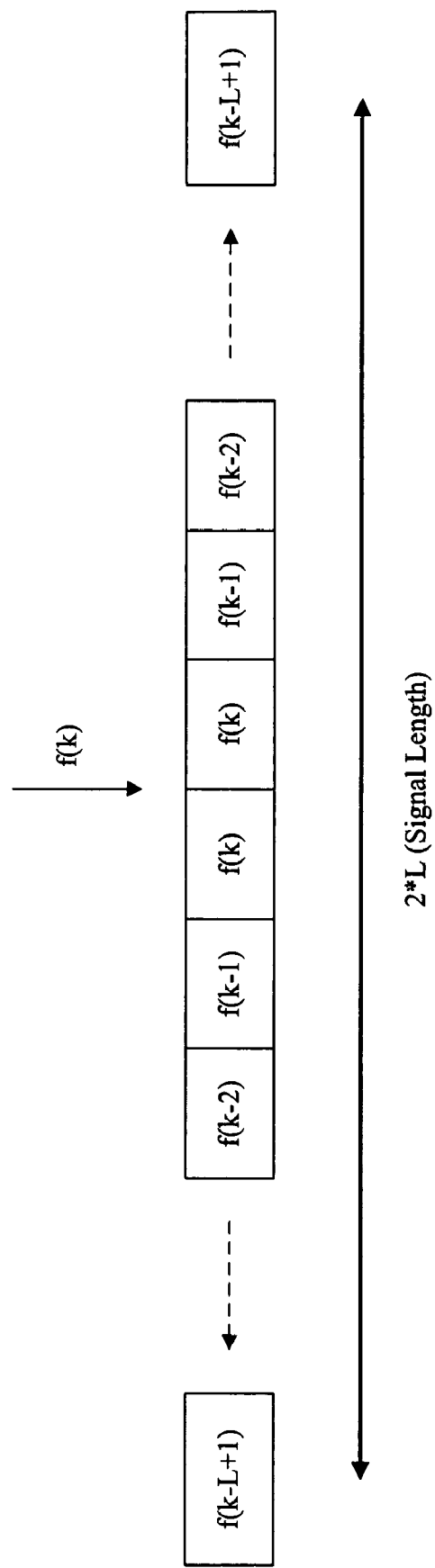
FIG. 3 is a block diagram illustrating an example signal pipeline architecture of the present invention.

Real-time control systems may employ real-time signal processing. In one example, a signal pipeline data architecture, illustrated in FIG. 3, facilitates multi-level decomposition for real time operations. An example pipeline data architecture system and method includes:

1. A signal buffer of length L is chosen as $2^N$, where N is the number of levels of decomposition desired;
2. The signal buffer is initially filled with zeros. When the current sample ($k^{th}$) is available it is pipelined into the buffer using the First In First Out (FIFO) operation.
3. The signal buffer values are mirrored and appended to concentrate later data towards the center. The decomposition algorithm is then performed on the resultant signal buffer.

Figure 4:
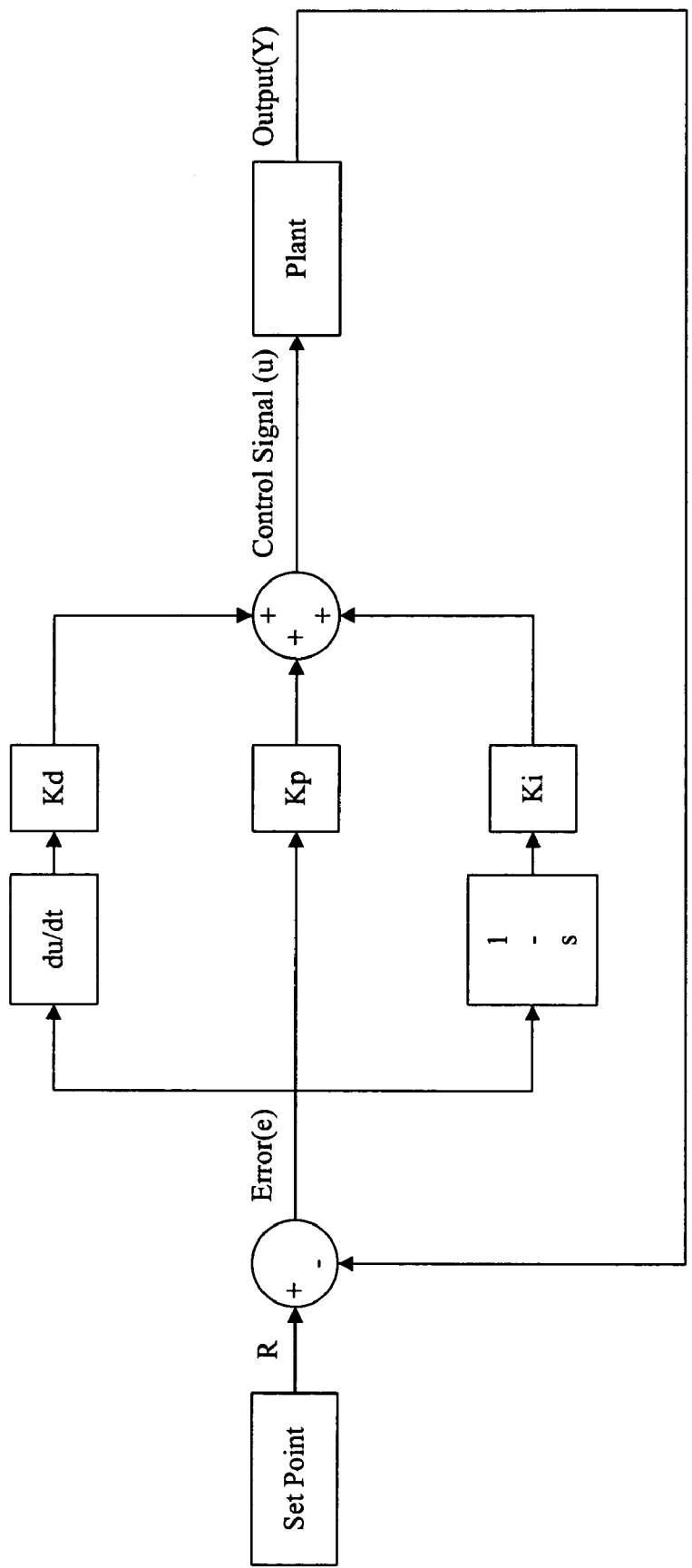
FIG. 4 is a block diagram illustrating an example system employing a PID controller.

Many industrial control applications still rely on a traditional PID controller. In general, a PID controller inputs error e and acts on e so that a control output u is generated as shown in Equation 9. Gains $K_P$, $K_I$ and $K_D$ are the Proportional, Integral and Derivative gains employed to act on the error, integral of the error, and derivative of the error respectively. In terms of frequency information, the proportional term scales all the frequencies in the error signal by a factor of $K_P$, the integral term scales the low frequency information of the error signal by a factor of $K_I$ and derivative term scales the high frequency information of the error signal by a factor $K_D$. The control signal u is generated by summing the three terms as shown in Equation 9 and FIG. 4.

A WC decomposes the error signal into its high, low and intermediate scale components using, for example, Equation 6. These components are multiplied by their respective gains and summed in the control signal generator block to generate the control signal u as shown in Equation 10.

$$u_{PID} = K_P * e + K_I * \int e + K_D * \dot{e} \quad (9)$$

$$u_{WC} = K_H * e_H + K_{M_1} * e_{M_1} + \ldots + K_{M_{N-1}} * e_{M_{N-1}} + K_L * e_L \quad (10)$$

More generally, the control signal can also take on the form of $$u_{WC} = K_H * f_H(e_H) + K_{M_1} * f_{M_1}(e_{M_1}) + \ldots + K_{M_{N-1}} * f_{M_{N-1}}(e_{M_{N-1}}) + K_L * f_L(e_L) \quad (11)$$

where $f_i(.)$ are functions to be determined by the designers appropriately. Examples of these functions include differentiation, integration, nonlinear gains, etc.

Unlike a PID controller, which has three tuning parameters (gains), a multi-resolution controller according to the present invention may have two or more parameters based on the number of error signal decomposition levels. For example, a one-level decomposition yields a low and a high-scale component. So a controller with a one-level decomposition will have two gains. To capture more information, if a two-level error signal decomposition is performed, three signal components are produced. Gain functions or coefficients are applied to these components, and the resulting transformed components are added together to generate the control signal.

Figure 5A:
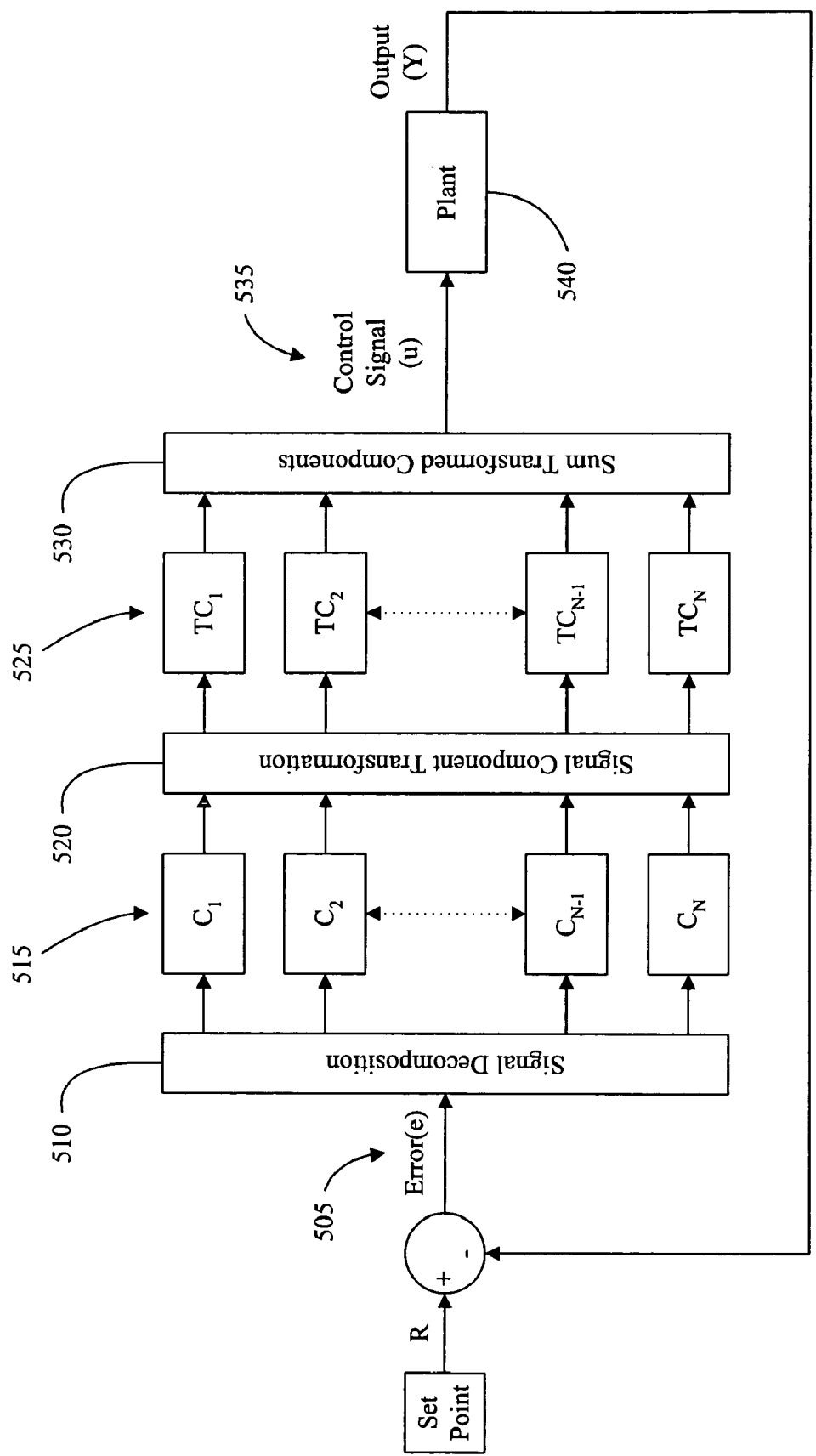
FIGS. 5A and 5B are a block diagrams illustrating example systems employing a controller according to the present invention.

FIG. 5A illustrates a general implementation of the present invention. An error signal (e) 505 is received and decomposed (510) into a plurality of signal components 515. The signal components 515 are transformed (520) into a plurality of transformed components 525. The transformation may include the application of any function or coefficient to a decomposed signal component. The transformed signal components 525 are summed (530) to generate a control signal 535. The control signal may be used, for example, by a plant 540 to correct or compensate for the error (e). As is commonly known in the art, a plant refers to the object that is to be controlled, the system under control, and/or the controlled system.

In FIG. 5A, the decomposition of the signal components 515 is performed using a set of orthogonal functions, such that the sum of the signal components 515 equals the error signal (e) 505. Unlike the prior art PID controllers which apply functions, namely P, I and D functions, to the error signal itself, the present invention decomposes the error signal and applies functions and/or coefficients to the components.

Figure 5B:
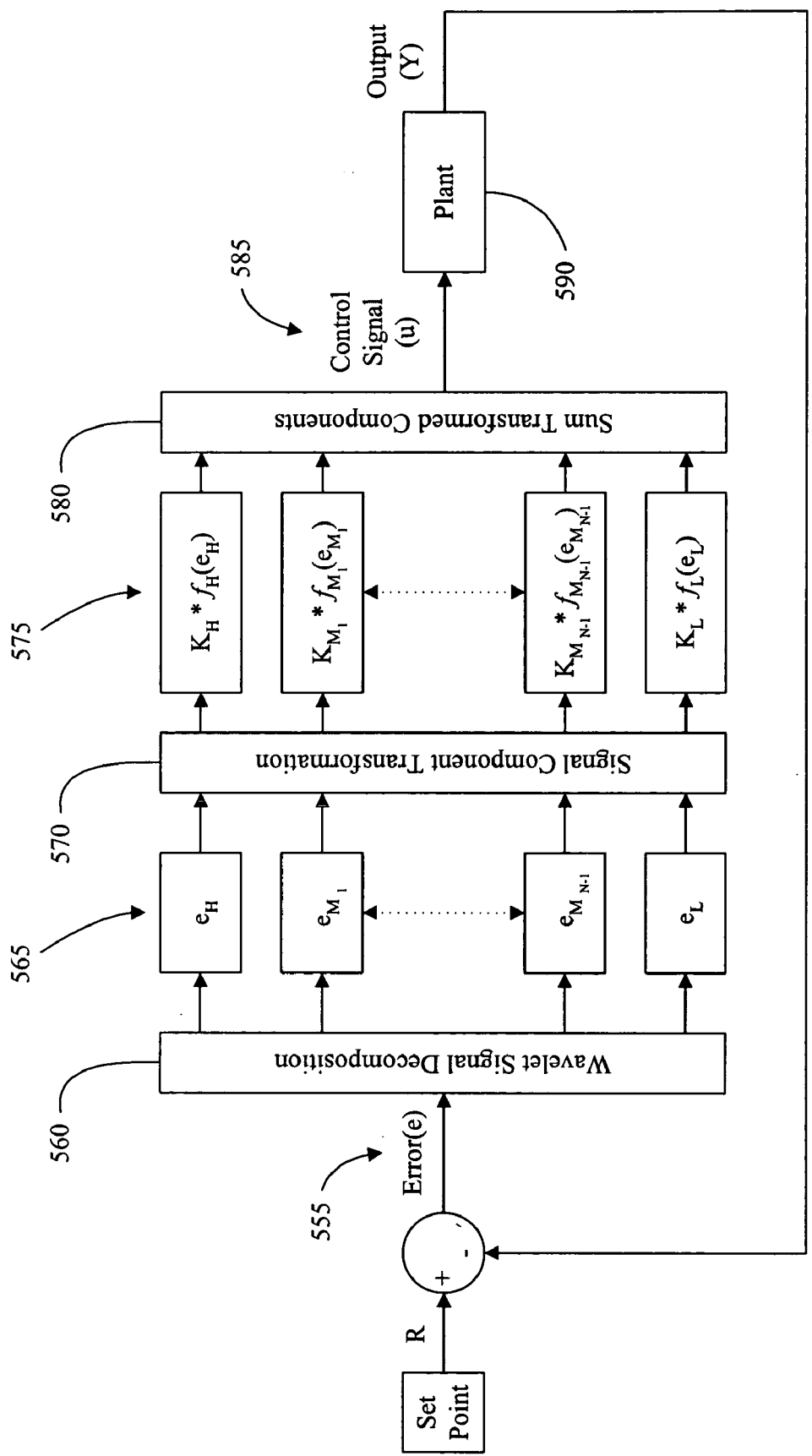

FIG. 5B illustrates a more specific implementation of the present invention using wavelet theory. An error signal (e) 555 is received and decomposed according to wavelet theory (560) into a plurality of wavelet signal components 565. The wavelet signal components include high, medium and low components. The signal components 565 are transformed (570) into a plurality of transformed wavelet components 575. The illustrated transformation includes the application of any function ($f$) and a coefficient (K) for each wavelet signal component 565. The transformed signal components 575 are summed (580) to generate a control signal 585. The control signal may be used, for example, by a plant 590 to correct or compensate for the error (e). As is commonly known in the art, a plant refers to the object that is to be controlled, the system under control, and/or the controlled system.

Since there are a number of different wavelets, choice of a wavelet affects the performance of the controller. In general there are two kinds of choices to make. The first choice concerns the representation system, such as continuous or discrete. The second choice concerns the properties of the wavelets, such as the number of degree of regularity, for example. A common theme when choosing concerns trade offs. Higher frequency resolution produces lower time resolution. Vanishing moments require increasing wavelet size. In one example, "Daubechies" wavelets of order 4 are suitable for control. While Daubechies wavelets of order 4 are described, it is to be appreciated that other wavelets of other orders can be employed.

Physical systems may be subjected to extraneous signals or noise during operation. Therefore, control system design considers sensitivity to noise and disturbance. The effect of feedback on noise and disturbance may depend on where extraneous signals occur in the system. Feedback may reduce the effect of noise and disturbance on system performance. In practice, disturbance and commands are often low-frequency signals whereas sensor noises are often high-frequency signals. This complicates minimizing the effect of these uncertainties simultaneously in conventional systems.

Figure 6:
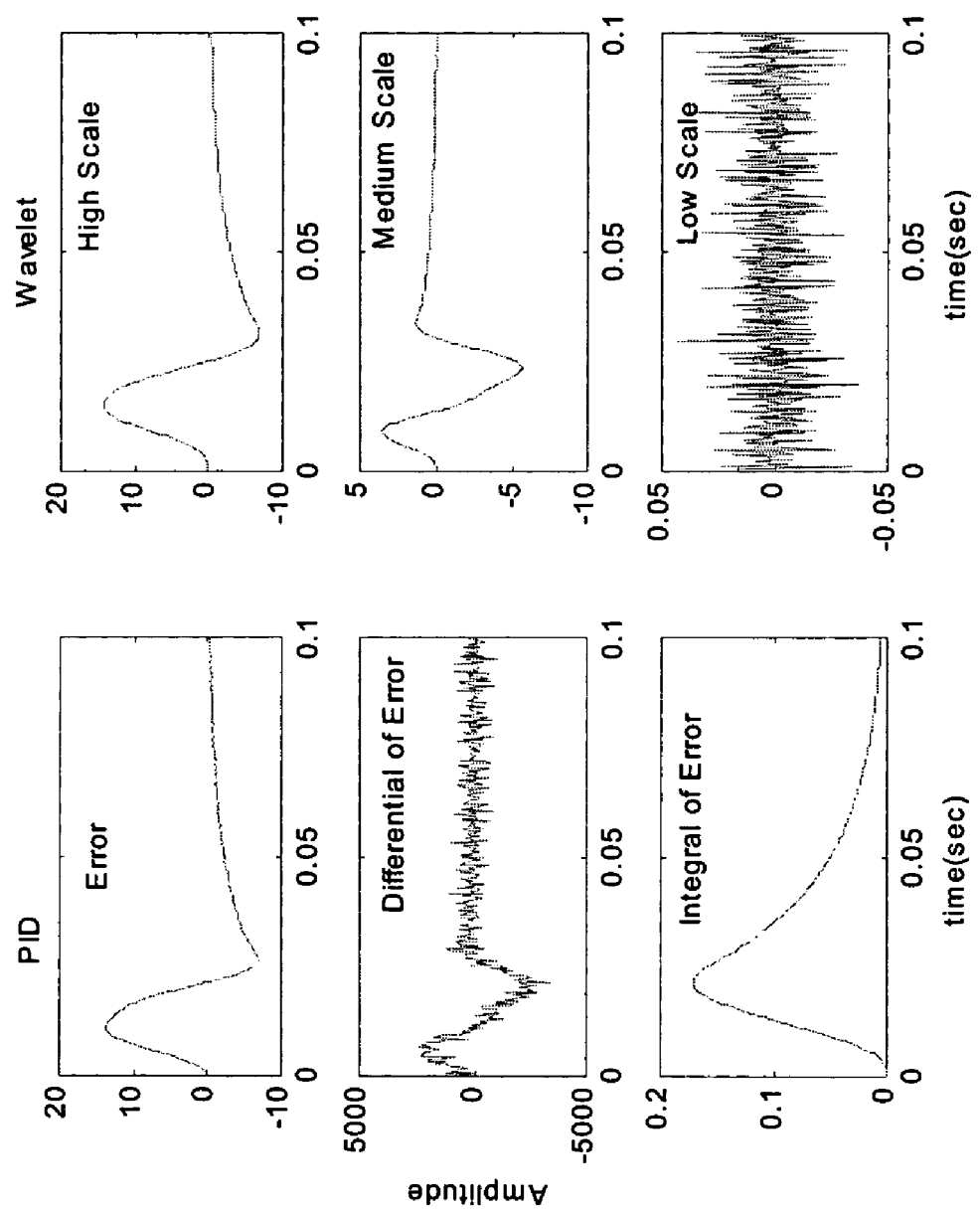
FIG. 6 are six graphs illustrating comparative signals of a PID controller and a three level decomposition of the present invention.

A multi-resolution controller, such as a WC, facilitates minimizing the effect of simultaneous uncertainties. FIG. 6 compares signals generated by applying a PID scheme (error, differential of error and integral of error) to an error signal and a multi-resolution decomposition (low scale, medium scale and high scale) of the error signal. The high scale signal filters out noise and high frequency distortion from the error signal. Increasing the gain corresponding to high scale signal pushes the control bandwidth and improves the disturbance rejection of the plant.

Now consider the medium scale signal in the FIG. 6. It approximates the error signal differential with low gain and it has low noise content compared to pure differentiation. This relatively noise free differentiation facilitates increasing the corresponding gain and to add damping to the plant thereby improving its transient response. The lowest scale signal filters out the noise. Adjusting the lowest scale gain $K_L$ to zero produces a relatively smooth control signal and reduces the effect of noise on the plant output. Smoothing control effort facilitates improving motor life and overall plant performance.

Wavelet Based Differentiator

Differentiation may be compromised by noise corruption. A pure differentiation may not be physically realizable due to noise amplification. An approximation differentiation with good noise immunity facilitates achieving high control performance. In the framework of practical constraints, with dynamic uncertainties in the plant, second order linear approximate differentiators may exhibit improved performance.

The medium scale signal plotted in FIG. 6 illustrates that wavelets (e.g., Daubechies wavelets) that have a differencing property can differentiate a signal within the framework of multi-resolution decomposition. To achieve improved noise immunity, a simple thresh-holding can be employed.

In one example, real time signal differentiating employs the same multi-resolution decomposition algorithm described above. One example algorithm framework is described below.

1. With Daubechies wavelets as a basis, compute DWT coefficients using the analysis part of the decomposition algorithm for N number of levels and a signal length of $L=2^N *W$. Where, W is the size of the wavelet filter
2. Arrange the coefficients in ascending order of absolute value.
3. Compute the median of the coefficients $\mu$.
4. Compute the threshold as $\sqrt{2*\log(L)}*(\mu/0.675)*\delta$, where $\delta$ is and external parameter that can be changed to reflect the amount of noise present in the signal.
5. Coefficients with absolute value less than the threshold computed in step 4 are set to zero.
6. The resultant coefficients are used to compute the decomposed signals using the synthesis part of the decomposition algorithm.
7. The decomposed signal with scale just below the low scale signal ($f_{M_1}$ in Eq 8) yields the differentiated signal with most noise immunity.

Figure 7:
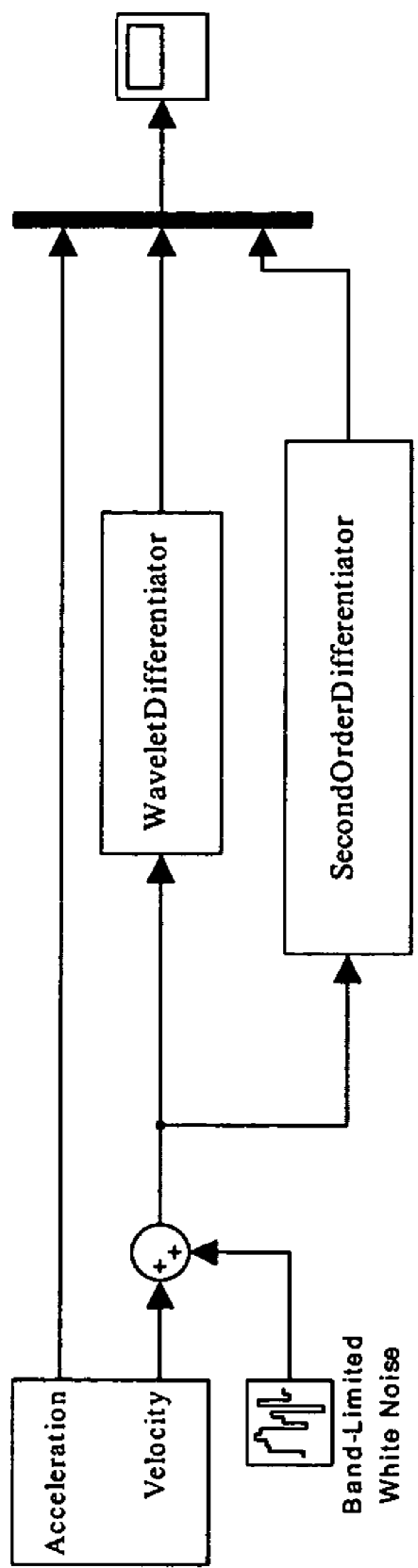
FIG. 7 is a block diagram illustrating the comparison of differentiated signals using a second order linear approximation and a multi-resolution wavelet differentiator.

FIG. 7 shows the simulation block diagram for comparing differentiated signals using a second order linear approximation and a wavelet differentiator. The parameters N and $\delta$ are the configurable parameters in the wavelet differentiator. $\delta$ can be tuned to change the amount of noise rejection desired in the differentiated signal. Changing the parameter N changes the number of decomposition levels. As N increases, the output signal resolution increases. However, this adds delay to the output.

Simulation results are plotted in FIG. 7. The wavelet differentiated signal provides less phase lag compared to the second order differentiation. Furthermore the signal between 0.05 and 0.1 seconds illustrates that wavelet based differentiation provides improved noise rejection compared to a second order differentiator.

Multi-Resolution Controller Methodology

Figure 8:
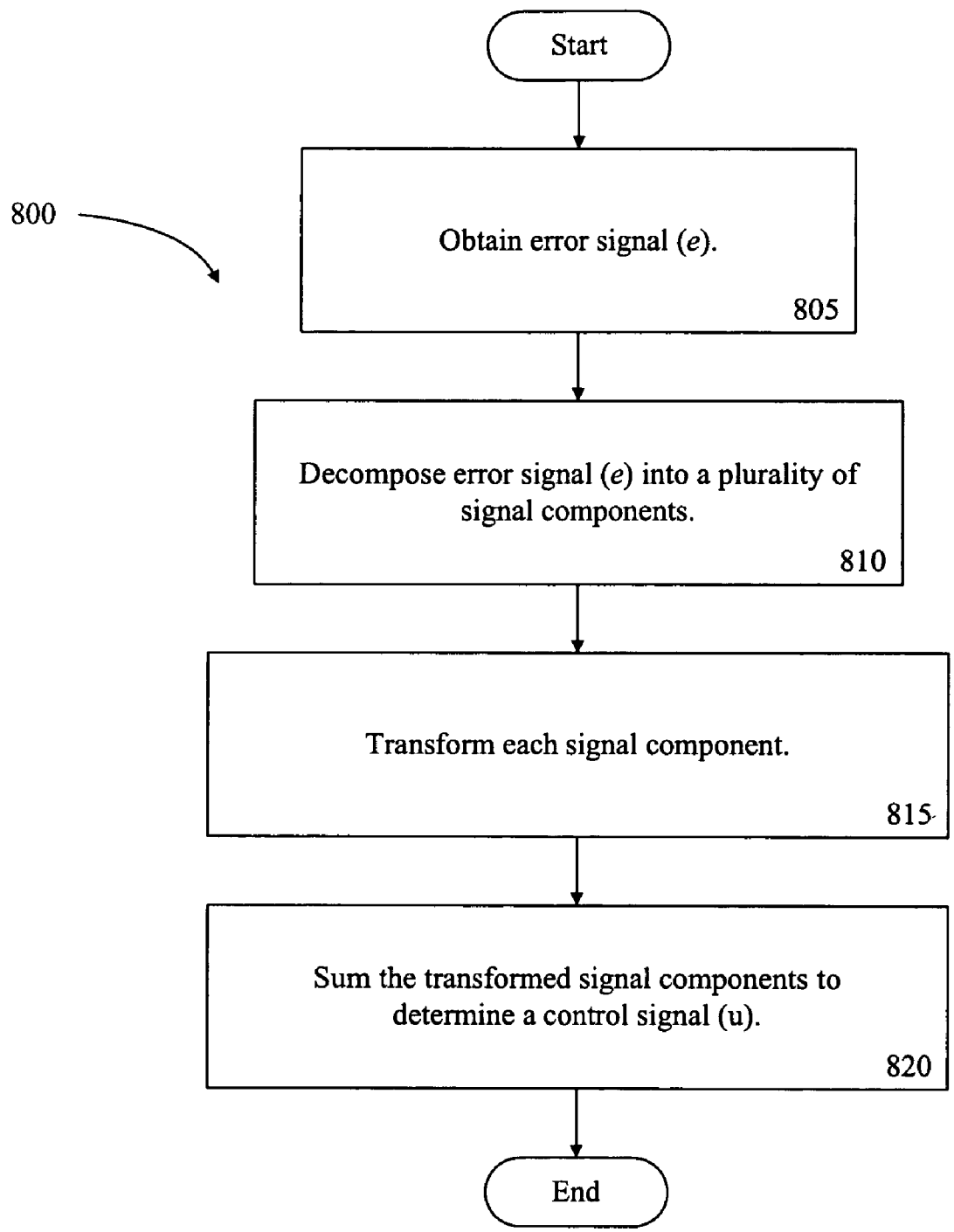
FIG. 8 is a block diagram illustrating one example methodology of the present invention.

Using the multi-resolution analysis, presented herein, an example computer implemented method 800 as shown in FIG. 8 can be employed to facilitate obtaining a control signal for various applications. At block 805, the method 800 obtains an error signal (e). The error signal may be obtained in any of a variety of ways known in the art including receiving the error signal from a physical monitor or from a software application. Upon obtaining the error signal, the method 800, at block 810, decomposes the error signal, using a set of orthogonal functions, into a plurality of signal components. In one embodiment, the signal components may represent low, intermediate and high signal components derived according to wavelet theory.

At block 815 of method 800, each of the signal components are transformed. Such transformation may include multiplying a signal component by an associated numeric gain. Of course, selecting a gain value of zero for any signal component effectively eliminates any effect that its corresponding signal component may have on the control signal. Further, such transformation may include applying an associated function to a signal component. The function may be linear or non-linear. The transformation of each signal component may be applying a numeric gain or function that is determined to achieve certain desired results.

At block 820, the control signal (u) is determined by summing the scaled signal components. Once the control signal is determined, it may be transmitted to another application or to a physical controller.

In one example embodiment, the signal decomposition equations and transformation functions may be selected to produce transformed signal components approximating the three tuning parameters of a conventional PID controller. The gains for all other signal components may be set to zero, thereby facilitating emulation of a conventional PID controller.

A significant benefit of using orthogonal functions, such as wavelet transforms, to decompose the error signal of a controller into several components is that one may choose to scale these components using different weights or functions before passing them to the controller, thus reducing the contribution of those components containing disturbances and noise before they are used in the recombination of the new control signal. This decomposition and recombination, unlike the filters commonly utilized in classic control theory, do not distort the components of the error that one finds useful in the control algorithm. The control signal can therefore be more "aggressive", i.e. faster and more accurate, without the presence of noise and oscillation on the signal, which causes constant "jitter", "flutter" or "chatter" of the device being controlled. This constant control action is not only inaccurate, it usually leads to accelerated wear and early failure of whatever device is being controlled.

The applications which can benefit from the present invention include, but are not limited to, motion control, pH control, aeronautics, avionics, astronautics, servo-control, and other device control. In an example application controlling valves in a pipeline, use of the present invention can reduce or eliminate the "flutter" and premature failure of such valves, a very expensive problem to find and repair. The pipes can be carrying oil across states, wastewater at the local treatment plant, cooling water in a nuclear power plant, or natural gas to a consumer's home. In applications controlling other machinery, the present invention can reduce or prevent the "buzz" of motors which may cause excessive wear on any attached gearboxes or transmissions, whether on a factory floor or in a family's laundry room.

Another application of the present invention includes controlling the read/write head of a computer hard disk drive. Use of the present invention enables the head to be positioned with greater accuracy, leading to higher memory densities. The head controlled by the present invention is also more stable on the end of the positioning arm, increasing the life of the hard disk drive, and reducing the susceptibility to a "head crash" and lost data, a priceless commodity. The same benefits can be achieved for DVD/CD drives, in a computer or in an entertainment system. Greater accuracy in such applications leads to an increased useful life of such devices.

The present invention may also be used to control Constant Velocity Transmissions (CVT) and anti-lock braking systems in automobiles which may result in can be much smoother operation and increased life of these systems.

In another application, the present invention may be used to control satellite antennae. The antennae can be more precisely positioned and more rigidly held on line, allowing more bandwidth for the transmitted signal, and also lowering the waste of resending damaged information packets. In another application, surveillance cameras can be held more steadily and can focus more precisely, increasing the fidelity of the image and lowering the chance of false positives.

Robotic surgery can also benefit from use of the present invention enabling such surgery to be much more precise and stable, raising the number of opportunities where it may be practiced, and reducing the amount of cutting and scarring needed to perform life enhancing medical procedures.

Multi-Resolution Controller System/Apparatus

Figure 9:
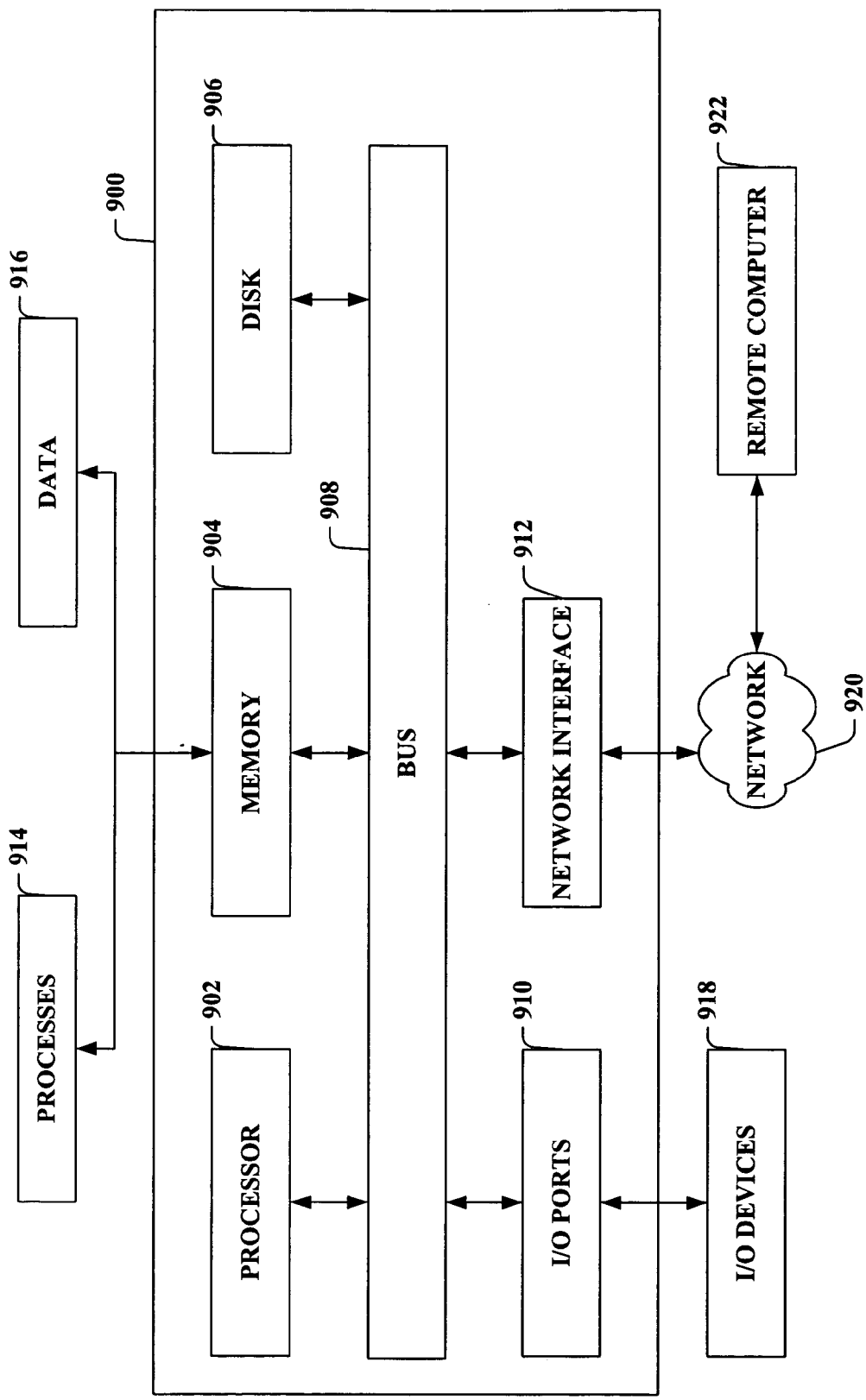
FIG. 9 is a schematic block diagram illustrating an example computing environment.

One embodiment of a multi-resolution wavelet controller may be a programmed general purpose computer 900 as illustrated in FIG. 9. FIG. 9 illustrates computer 900 that includes a processor 902, a memory 904, a disk 906, input/output ports 910, and a network interface 912 operably connected by a bus 908. Executable components of the systems described herein may be located on a computer like computer 900. Similarly, computer executable methods described herein may be performed on a computer like computer 900. It is to be appreciated that other computers may also be employed with the systems and methods described herein.

The processor 902 can be a variety of various processors including dual microprocessor and other multi-processor architectures. The memory 904 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM). The disk 906 can include, but is not limited to, devices like a magnetic disk drive, a floppy disk drive, a tape drive, a Zip drive, a flash memory card, and/or a memory stick. Furthermore, the disk 906 can include optical drives like, a compact disk ROM (CD-ROM), a CD recordable drive (CD-R drive), a CD rewriteable drive (CD-RW drive) and/or a digital versatile ROM drive (DVD ROM). The memory 904 can store processes 914 and/or data 916, for example. The disk 906 and/or memory 904 can store an operating system that controls and allocates resources of the computer 900.

The bus 908 can be a single internal bus interconnect architecture and/or other bus architectures. The bus 908 can be of a variety of types including, but not limited to, a memory bus or memory controller, a peripheral bus or external bus, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 900 interacts with input/output devices 918 via input/output ports 910. Input/output devices 918 can include, but are not limited to, a keyboard, a microphone, a pointing and selection device, cameras, video cards, displays, and the like. The input/output ports 910 can include but are not limited to, serial ports, parallel ports, and USB ports.

The computer 900 can operate in a network environment and thus is connected to a network 920 by a network interface 912. Through the network 920, the computer 900 may be logically connected to a remote computer 922. The network 920 can include, but is not limited to, local area networks (LAN), wide area networks (WAN), and other networks. The network interface 912 can connect to local area network technologies including, but not limited to, fiber distributed data interface (FDDI), copper distributed data interface (CDDI), ethernet/IEEE 802.3, token ring/IEEE 802.5, and the like. Similarly, the network interface 912 can connect to wide area network technologies including, but not limited to, point to point links, and circuit switching networks like integrated services digital networks (ISDN), packet switching networks, and digital subscriber lines (DSL). Since the computer 900 can be connected with other computers, and since the systems and methods described herein may include distributed communicating and cooperating computer components, information may be transmitted between these components.

The systems, methods, and objects described herein may be stored, for example, on a computer readable media. Media can include, but are not limited to, an ASIC, a CD, a DVD, a RAM, a ROM, a PROM, a disk, a carrier wave, a memory stick, and the like.

What has been described above includes several examples. It is, of course, not possible to describe every conceivable combination of components or methodologies for purposes of describing the systems, methods, computer readable media and so on related to wavelet based controllers. However, one of ordinary skill in the art may recognize that further combinations and permutations are possible. Accordingly, this application is intended to embrace alterations, modifications, and variations that fall within the scope of the appended claims. Furthermore, the preceding description is not meant to limit the scope of the invention. Rather, the scope of the invention is to be determined only by the appended claims and their equivalents.

While the systems, methods and so on herein have been illustrated by describing examples, and while the examples have been described in considerable detail, it is not the intention of the applicants to restrict or in any way limit the scope of the appended claims to such detail. Additional advantages and modifications will be readily apparent to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for producing a control signal associated with controlling a plant, comprising:
    identifying an error signal associated with a difference between a set point and an output signal from the plant;
    decomposing the error signal into a plurality of error signal components, a sum of the plurality of error signal components being equal to the error signal, the plurality of error signal components being determined based on a plurality of orthogonal functions representing multi-resolution decomposition properties;
    transforming each error signal component to provide a corresponding plurality of control signal components; and
    summing the plurality of control signal components to form the control signal.

2. The method of claim 1, wherein the plurality of orthogonal functions include at least one function describing wavelets.

3. The method of claim 1, wherein transforming includes differentiation of at least one error signal component.

4. The method of claim 1, wherein transforming includes integration of at least one error signal component.

5. The method of claim 1, wherein transforming includes scaling of at least one error signal component.

6. The method of claim 1, wherein transforming includes applying a linear function to at least one error signal component.

7. The method of claim 1, wherein transforming includes applying a non-linear function to at least one error signal component.

8. The method of claim 1, wherein the control signal is formed in real time.

9. The method of claim 1, wherein one of the error signal components is the differential of the error signal using Daubechies wavelets.

10. The method of claim 1, wherein identifying an error signal includes receiving the error signal.

11. The method of claim 1, wherein the plurality of control signal components includes each of a low, intermediate and high scale component.

12. The method of claim 1, wherein the control signal may be represented as:

$$u = K_H^* f_H(e_H) + K_{M_1}^* f_{M_1}(e_{M_1}) + \ldots + K_{M_{N-1}}^* f_{M_{N-1}}(e_{M_{N-1}}) + K_L^* f_L(e_L)$$

13. The method of claim 12, wherein each function $f_i(.)$ can be a linear or a non-linear function.

14. The method of claim 12, wherein each control signal component is a function of time and frequency.

15. The method of claim 12, wherein the plurality of control signal components includes (de/dt)Kd, and Kp.

16. The method of claim 15, wherein summing the plurality of control signal components includes summing only (de/dt)Kd, and Kp to emulate a PD controller output.

17. The method of claim 12, wherein the plurality of control signal components includes (de/dt)Kd, (1/s)Ki, and Kp.

18. The method of claim 17, wherein summing the plurality of control signal components includes summing (de/dt)Kd, (1/s)Ki, and Kp to emulate a PID controller output.

19. A system for producing a control signal associated with controlling a plant, comprising:
- means for identifying an error signal associated with a difference between a set point and an output signal from the plant;
- means for decomposing the error signal into a plurality of error signal components, a sum of the plurality of error signal components being equal to the error signal, the plurality of error signal components being determined based on a plurality of orthogonal functions representing multi-resolution decomposition properties;
- means for transforming each error signal component to provide a corresponding plurality of control signal components; and
- means for summing the plurality of control signal components to form the control signal.

20. The system of claim 19, wherein the means for decomposing the error signal into a plurality of error signal components employs at least one function describing wavelets.

21. The system of claim 19, wherein the means for transforming includes means for differentiating at least one error signal component.

22. The system of claim 19, wherein the means for transforming includes means for integrating at least one error signal component.

23. The system of claim 19, wherein the means for transforming includes means for scaling at least one error signal component.

24. The system of claim 19, wherein the means for transforming includes means for applying a linear function to at least one error signal component.

25. The system of claim 19, wherein the means for transforming includes means for applying a nonlinear function to at least one error signal component.

26. The system of claim 19, wherein the means for decomposing produces the differential of the error signal using Daubechies wavelets.

27. The system of claim 19, wherein the means for identifying an error signal includes means for receiving the error signal.

28. The system of claim 19, wherein the means for transforming produces each of a low, intermediate and high scale component.

29. The system of claim 19, wherein the control signal may be represented as:

$$u = K_H * f_H(e_H) + K_{M_1} * f_{M_1}(e_{M_1}) + \ldots + K_{M_{N-1}} * f_{M_{N-1}}(e_{M_{N-1}}) + K_L * f_L(e_L)$$

30. The system of claim 29, wherein each function $f_i(.)$ can be a linear or a non-linear function.

31. The system of claim 29, wherein the means for transforming produces a plurality of control signal components including (de/dt)Kd, and Kp.

32. The system of claim 31, wherein means for transforming produces (de/dt)Kd, and Kp to emulate a PD controller output.

33. The system of claim 29, wherein the means for transforming each error signal component produces (de/dt)Kd, (1/s)Ki, and Kp.

34. The system of claim 33, wherein the means for summing sums (de/dt)Kd, (1/s)Ki and Kp to emulate a PID controller output.

35. An apparatus for producing a control signal associated with controlling a plant, comprising:
- a processor; and
- a memory operatively connected to the processor, said memory storing control logic for directing the processor to:
  - identify an error signal associated with a difference between a set point and an output signal from the plant;
  - decompose the error signal into a plurality of error signal components, a sum of the plurality of error signal components being equal to the error signal, the plurality of error signal components being determined based on a plurality of orthogonal functions representing multi-resolution decomposition properties;
  - transform each error signal component to provide a corresponding plurality of control signal components; and
  - sum the plurality of control signal components to form the control signal.

36. A computer-readable storage medium encoded with processing instructions for producing a control signal associated with controlling a plant, the processing instructions for directing a computer to perform the steps of:
- identifying an error signal associated with a difference between a set point and an output signal from the plant;
- decomposing the error signal into a plurality of error signal components, a sum of the plurality of error signal components being equal to the error signal, the plurality of error signal components being determined based on a plurality of orthogonal functions representing multi-resolution decomposition properties;
- transforming each error signal component to provide a corresponding plurality of control signal components; and
- summing the plurality of control signal components to form the control signal.

* * * * *